June 22, 1954  H. F. SMITH  2,681,662
BALL COCK VALVE
Filed July 27, 1949
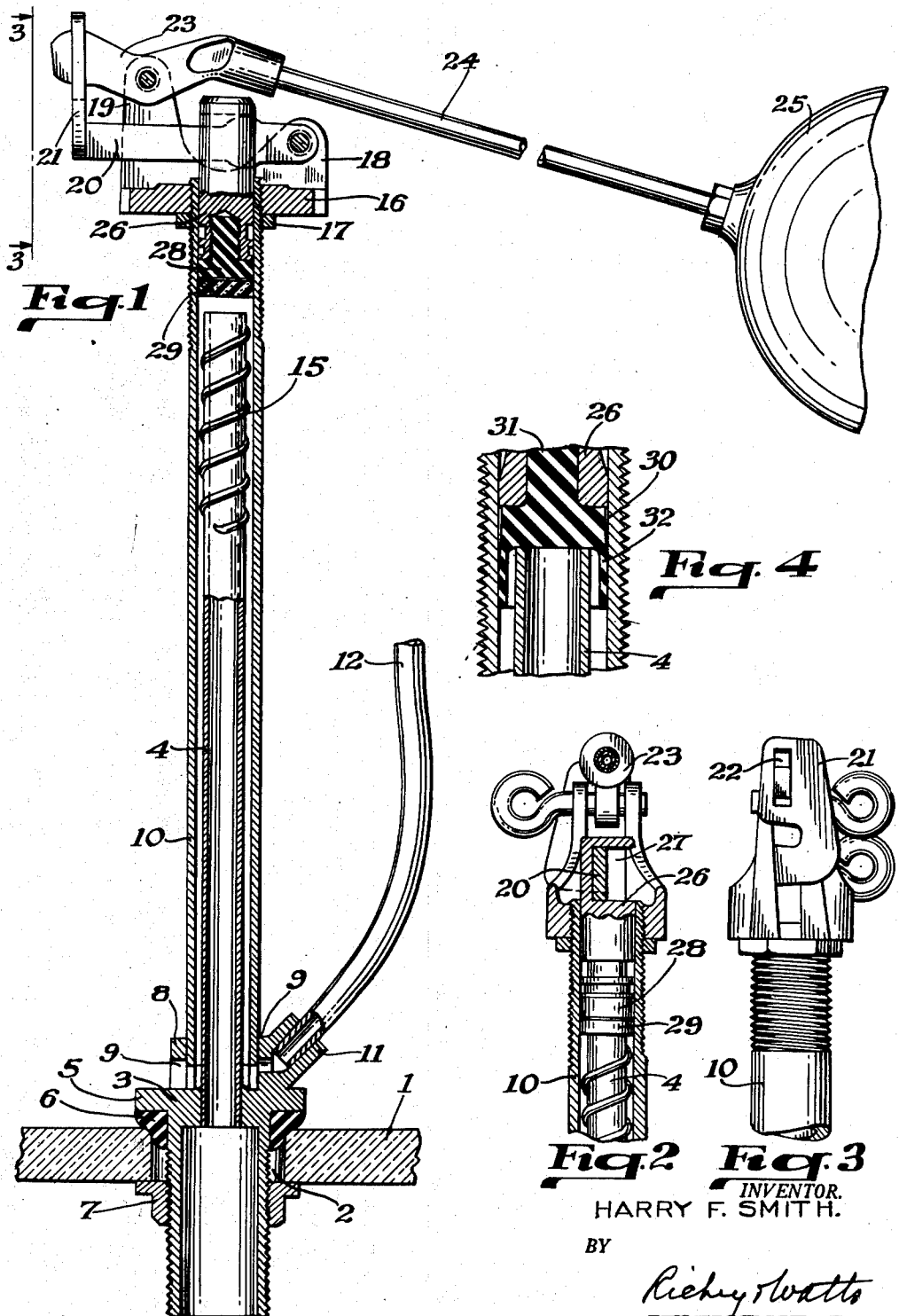
INVENTOR.
HARRY F. SMITH.
BY
Richey & Watts
ATTORNEYS.

Patented June 22, 1954

2,681,662

UNITED STATES PATENT OFFICE 2,681,662

BALL COCK VALVE

Harry F. Smith, Lexington, Ohio, assignor to Mansfield Sanitary Pottery, Inc., Perrysville, Ohio, a corporation of Ohio Application July 27, 1949, Serial No. 107,073

4 Claims. (Cl. 137—437)

This invention relates generally to ball cocks for flush tanks and particularly to ball cocks of the fixed hush pipe type.

Prior ball cocks have been notoriously noisy due partly to removal of refill water from the upper part of the hush pipe and partly to a substantially uniform rate of closing movement of the valve. By the present invention the amount of noise has been considerably reduced and such reduction has been accomplished by means of new valve means and a new manner of removing refill water.

The present invention will be better understood by those skilled in the art from the following description and the drawings which accompany and form a part of this specification, and in which, Fig. 1 is a vertical, sectional view, partly in elevation, of a ball cock embodying the present invention with the parts shown in valve open position.

Fig. 2 is a vertical, sectional view, with parts in elevation, of the upper end portion of the apparatus of Fig. 1 with the valve shown in closed position;

Fig. 3 is an elevational view looking in the line indicated by line 3—3 of Fig. 1; and Fig. 4 is a fragmentary, vertical, sectional view of a modified form of valve.

In Figs. 1 to 3, the bottom wall of a flush tank is shown fragmentarily at 1 and extending through the hole 2 thereof is an inlet pipe comprising a nipple or spud 3 and a small diameter tube 4. The spud 3 has a flange 5 to press a gasket 6 into liquid sealing engagement with the tank wall 1 around opening 2. A nut 7, screwed onto the spud 3, serves to complete the sealing action of flange 5 and gasket 6.

The spud 3 is extended upwardly beyond flange 5 to form a hollow post 8 which has lateral openings 9 communicating with the interior of hush pipe 10 at its lower end. On one side the post projects laterally to form a hollow stud 11 in which a refill tube 12 may be secured to receive water from within the hush pipe.

The portion 4 of the inlet pipe has a valve seat at its open upper end and carries a spiral spring 15 on its outer surface, one end of the spring being secured to the pipe.

The hush pipe 10 is fixed in position in post 8 and is exteriorly threaded at its upper end to receive a valve assembly. This assembly includes a bracket 16 having screw threaded engagement with the hush pipe and a lock nut 17 thereneath also having screw threaded engagement with the hush pipe. Bracket 16 has two upwardly projecting ears 18 and 19, an arm 20 is pivoted at one end in ear 18 and extends across the top of hush pipe 10 and beyond ear 19 and has an upwardly extending part 21 provided with an opening 22 to receive one end of a lever 23 which has a float rod 24 and float 25. A valve plunger 26 is slidable endwise in hush pipe 10, has a notch 27 in its upper end to receive arm 20 and at its lower end has a tapped hole to receive a valve packing 28. This packing may be provided with a disk 29 of packing material to engage the valve seat at the upper end of pipe 4 and shut off the flow of water through that pipe. Preferably the valve packing 28, when used alone, or the disk 29, when used in conjunction therewith, is of resilient deformable material, such as soft rubber, so that it will be deformed radially into fluid sealing contact with the inner surface of hush pipe 10 by the pressure exerted axially thereon by water flowing out of pipe 4. In this manner leakage of water up past the valve plug 26 while the valve is open is prevented. Since the pressure exerted on the inner surface of pipe 10 by the disk 29, or the plug 28 when that disk is omitted, varies directly with the pressure of liquid on such part, it follows that the greatest pressure against the side wall is when the valve is fully opened and the least pressure is when the valve is fully closed. The full pressure is sufficient to deform the packing against the interior surface of the hush pipe and thereby to create enough friction to cause movement of the float even when submerged to an extent somewhat in excess of its normal amount of submergence when the valve is closed. When it reaches the extra submerged position the float overcomes the friction between the packing and hush pipe surface and moves up thereby moving the valve toward seated position. Since the pressure exerted on the packing by the water decreases rapidly as the valve nears its closed position, this friction decreases very rapidly near the end of the closing movement of the valve. This rapid decrease in friction permits the float to rise rapidly from its excessive submergence, in fact, almost to pop up, and thereby to close the valve very rapidly after the closing movement starts. A direct result of such increased closing speed is a marked diminution in noise.

The spring 15 serves to decrease noise by causing turbulence of the water between the hush pipe and inlet pipe with resultant decrease in velocity. This turbulence is caused by the intersection of a ribbon-like stream of water flowing around pipe 4 between the turns of the spring 15 and a cylindrical stream flowing between the inner surface of pipe 10 and the outer periphery of spring 15.

Since the velocity of the water has been reduced to a fairly low value when it reaches the lower end of the hush pipe 10, it will flow into refill tube 12 with substantially no noise.

In Fig. 4 is shown a modified form of valve in which the readily deformable resilient packing, soft rubber, for example, comprises a cylindrical body 30 which is slightly smaller in diameter than hush pipe 10, a stud 31 projecting axially from the body to enter an opening in plug 26 and position the body on the end of the plug, and a thin sleeve 32 surrounding pipe 4 and deformable, by the pressure of water flowing from pipe 4, into fluid sealing contact with the inner surface of the hush pipe. When the valve is opened the water presses sleeve 32 tightly against the hush pipe thereby sealing against flow of water up past plug 26 but when the valve is closing the sleeve contracts from that deformed condition thereby decreasing its pressure on the hush pipe and permitting the plug to move and close the valve.

It will be understood that other variations of the valve assembly illustrated in Fig. 1 may be made without departing from the spirit of the present invention, an important part of which is a valve plug with a deformable packing which acts alternately to close the inlet pipe and to seal the upper end of the hush pipe when the valve is open.

Subject matter shown but not claimed in this application is being claimed in one or another of the following applications: Serial No. 759,064, filed July 5, 1947, now Patent No. 2,598,195, issued May 27, 1952; Serial No. 61,646, filed November 23, 1948, now Patent No. 2,609,830 issued September 9, 1952; and Serial No. 107,072, filed July 27, 1949, now Patent No. 2,607,364 issued August 19, 1952.

Having thus described the present invention so that others skilled in the art may be able to understand and practice the same, I state that what I desire to secure by Letters Patent is defined in what is claimed.

What is claimed is:

1. A ball cock valve for a flush tank comprising a spud, an elongated inlet pipe fixed at its lower end to said spud and having its upper end shaped to serve as a valve seat, a hush pipe of substantially uniform internal diameter and greater length than said inlet pipe, connected at its lower open end to said spud, surrounding said inlet pipe, and having an open upper end serving as a valve housing, a bracket having threaded engagement with the outside of the hush pipe near its open upper end for variable vertical desired positioning on the latter, a cylindrical plunger extending into and slidable endwise in the upper end of said hush pipe and carrying a deformable, double duty valve at its inner end, and means pivoted to said bracket and engaging the outer end of said plunger for moving the valve into engagement with said seat, said valve when pressed into engagement with the valve seat on the inlet pipe serving to seal the inlet pipe against flow of water therethrough and when out of engagement with said seat being deformable laterally into sealing contact with the inner surface of the hush pipe by the pressure of water flowing out of the inlet pipe.

2. The combination of elements set out in claim 1 in which the deformable valve has a stud to extend into said plunger and a thin cylindrical sleeve surrounding the upper end of the inlet pipe and engageable with the inner surface of the hush pipe with sealing contact.

3. The combination of elements set out in claim 1 in which the spud has a chamber connecting the lower end of the hush pipe with the interior of the tank.

4. The combination of elements set out in claim 1 in which the spud has a chamber outside of said inlet pipe and connecting the lower end of the hush pipe with the interior of the tank, and a refill tube is fixed to the spud and communicates with said chamber.

References Cited in the file of this patent

UNITED STATES PATENTS

| Number | Name | Date |
|---|---|---|
| 901,466 | Payne | Oct. 20, 1908 |
| 1,466,767 | Stoffel | Sept. 4, 1923 |
| 1,497,796 | Sherwood | June 17, 1924 |
| 1,545,444 | Papin | July 7, 1925 |
| 1,629,914 | Haas | May 24, 1927 |
| 1,641,756 | Haas | Sept. 6, 1927 |
| 1,691,224 | Butler | Nov. 13, 1928 |
| 1,889,566 | Pasman | Nov. 29, 1932 |
| 2,014,483 | Price et al. | Sept. 17, 1935 |
| 2,017,799 | Helfrich | Oct. 15, 1935 |
| 2,164,927 | Kohler | July 4, 1939 |
| 2,271,419 | Egan | Jan. 27, 1942 |
| 2,294,785 | Langdon | Sept. 1, 1942 |
| 2,318,236 | Layton | May 4, 1943 |
| 2,324,084 | Horner | July 13, 1943 |

FOREIGN PATENTS

| Number | Country | Date |
|---|---|---|
| 616,805 | Great Britain | Jan. 27, 1949 |